United States Patent
Onagi et al.

(10) Patent No.: US 8,077,576 B2
(45) Date of Patent: Dec. 13, 2011

(54) OPTIMUM GAP DETERMINED RECORDING/REPRODUCING APPARATUS AND METHOD

(75) Inventors: Nobuaki Onagi, Kanagawa (JP); Yasutomo Aman, Kanagawa (JP); Minoru Takahashi, Kanagawa (JP); Haruki Tokumaru, Tokyo (JP); Yoshimichi Takano, Tokyo (JP); Daiichi Koide, Tokyo (JP)

(73) Assignees: Ricoh Company, Ltd., Tokyo (JP); Nippon Hoso Kyokai, Tokyo (JP)

( * ) Notice: Subject to any disclaimer, the term of this patent is extended or adjusted under 35 U.S.C. 154(b) by 287 days.

(21) Appl. No.: 12/399,067

(22) Filed: Mar. 6, 2009

(65) Prior Publication Data
US 2009/0231975 A1    Sep. 17, 2009

(30) Foreign Application Priority Data
Mar. 14, 2008    (JP) ................................ 2008-066749

(51) Int. Cl.
*G11B 25/04*    (2006.01)
(52) U.S. Cl. .................. 369/53.43; 369/53.45
(58) Field of Classification Search ............. 360/130.34, 360/224; 369/263.1
See application file for complete search history.

(56) References Cited

U.S. PATENT DOCUMENTS

| | | | |
|---|---|---|---|
| 3,110,889 A * | 11/1963 | Morley et al. | 360/224 |
| 3,225,338 A * | 12/1965 | Kelner et al. | 360/99.01 |
| 5,886,489 A | 3/1999 | Rowan et al. | |
| 6,700,726 B1 * | 3/2004 | Gillis et al. | 360/75 |
| 7,164,629 B2 | 1/2007 | Aman et al. | |
| 7,194,750 B2 | 3/2007 | Aman et al. | |
| 7,233,554 B2 | 6/2007 | Onagi et al. | |
| 7,367,036 B2 | 4/2008 | Aman et al. | |
| 7,407,698 B2 | 8/2008 | Murata et al. | |
| 2003/0174599 A1 | 9/2003 | Aman et al. | |
| 2003/0198157 A1 | 10/2003 | Smith | |
| 2006/0051076 A1 | 3/2006 | Aman et al. | |
| 2007/0058500 A1 | 3/2007 | Onagi et al. | |
| 2007/0058510 A1 | 3/2007 | Aman et al. | |

(Continued)

FOREIGN PATENT DOCUMENTS

EP    1 763 025 A1    3/2007

(Continued)

OTHER PUBLICATIONS

English Machine Translation of Jp 2006-107699 (Aman et al., Recording/Reproducing Apparatus, Driving Method Thereof and Disk Cartridge, Apr. 20, 2006).*

*Primary Examiner* — Peter Vincent Agustin
*Assistant Examiner* — Mark Fischer
(74) *Attorney, Agent, or Firm* — Dickstein Shapiro LLP

(57) ABSTRACT

A recording/reproducing apparatus is disclosed that includes a spindle motor unit including a spindle on which a flexible recording disk is placed, a stabilizer plate disposed so as to face the recording disk, a torque detection unit configured to detect a drive torque applied to the spindle motor unit, an adjustment unit configured to adjust a gap between the recording disk and the stabilizer plate, and a determination unit configured to determine an optimal gap to be set to the gap based on the drive torque detected by the torque detection unit, in which the adjustment unit sets the optimum gap determined by the determination unit to the gap.

11 Claims, 15 Drawing Sheets

| U.S. PATENT DOCUMENTS | | | | FOREIGN PATENT DOCUMENTS | | |
|---|---|---|---|---|---|---|
| 2007/0107004 A1 | 5/2007 | Aman et al. | | JP | 1-502373 | 8/1989 |
| 2007/0248000 A1 | 10/2007 | Murata et al. | | JP | 2006-107699 | 4/2006 |
| 2007/0286045 A1 | 12/2007 | Onagi et al. | | JP | 2006-344291 | 12/2006 |
| 2008/0092152 A1 | 4/2008 | Onagi | | JP | 2007-149311 | 6/2007 |
| 2008/0301720 A1* | 12/2008 | Yamauchi et al. | 720/601 | KR | 1998-63397 | 10/1998 |
| 2009/0010123 A1 | 1/2009 | Koide et al. | | * cited by examiner | | |

OPTIMUM GAP DETERMINED RECORDING/REPRODUCING APPARATUS AND METHOD

CROSS-REFERENCE TO RELATED APPLICATIONS

The present application claims priority under 35 U.S.C §119 to Japanese Patent Application No. 2008-066749 filed Mar. 14, 2008, the entire contents of which are hereby incorporated herein by reference.

BACKGROUND OF THE INVENTION

1. Field of the Invention

The present invention generally relates to a recording/reproducing apparatus and a recording/reproducing method.

2. Description of the Related Art

As the digitization of television signals and the like has recently started, there is a growing demand for an information recording medium to record a large amount of digital data. To that end, for example, in the optical disk field, reducing the size of the optical spot converged onto an optical disk is thought to be one of the basic solutions for achieving high-density recording. (Herein, an optical disk is described as a representative of disk-shaped media used in a recording/reproducing apparatus according to embodiments of the present invention. However, the disk-shaped media applicable to the present invention are not limited to the optical disks. Namely, the present invention may be applied to any disk-shaped medium including, but not limited to, a phase-change memory, a magneto-optical memory, and a holographic memory.) In order to achieve the high-density recording/reproducing by reducing the size of the optical spot, it is important to reduce a vibration amount of the disk surface, so-called "surface vibration", when the disk is being rotated. To that end, there have been some proposed methods including a method of stabilizing the amount of the surface vibration by using stabilization means for aerodynamically stabilizing a disk medium having flexibility. The methods using such stabilization means for aerodynamically stabilizing a disk medium are described in, for example, Patent Documents 1 and 2.

Patent Document 1 describes a technique that, in a recording/reproducing apparatus, the distance between flat-plate stabilization means and a disk can be adjusted based on the rotational speed (rpm) of the disk and a tilt angle of the radius direction of the disk.

Patent Document 2 describes a technique that, in a recording/reproducing apparatus, by providing a spacer in rigid stabilization means, a certain interval (space) can be formed between the disk and the stabilization means.

As described in the above documents, by using a flexible medium as a recording disk and utilizing the aerodynamic functions of the stabilization means, stable recording/reproducing on the disk surface can be performed. Further, Patent Document 3 proposes stabilization means adapted to the magnetic disk field. Further, as modified stabilization means, Patent Document 4 describes curved stabilization means.

Further, as the demand for handling a large amount of digital data increases, there is also growing demand for faster data transmission rates. As a comprehensive example, the transmission rate 250 Mbps may be thought to be an important target. This is because this rate is required for recording broadcast HDTV footage. To be able to achieve this transmission rate across the entire disk surface, namely, in order to ensure such fast transmission rate at the inner part of the disk, fast driving to achieve 15,000 rpm becomes necessary. In addition, during the fast driving for recording/reproducing, it is also necessary to reduce the amount of the surface vibration from a viewpoint of the focus servo-following.

Patent Document 1: Japanese Patent Application Publication No: 2006-107699
Patent Document 2: Japanese Patent Application Publication No: 2006-344291
Patent Document 3: Japanese Patent Application Publication No: H1-502373
Patent Document 4: Japanese Patent Application Publication No: 2007-149311

However, in such a technique as described in Patent Document 1, the distance between the stabilization member (stabilization means) and the recording disk with respect to the rotational speed of the disk can be adjusted at specific distances stored in advance only. Therefore, it may not be possible to adaptively adjust the distance between the stabilization member and the recording disk to the optimal distance based on the considerations of the change over time and the load of the spindle motor.

On the other hand, in such a configuration as shown in Patent Document 2 where the flexible disk and the stabilization member on a rigid disk are synchronously rotated (with no relative speed) to stabilize air flow, the characteristics of disk-surface vibration may depend on the mechanical accuracy of the stabilization member itself. Therefore, it may be extremely difficult to obtain desirable characteristics in a very fast driving condition at, for example, 15,000 rpm or more and the rotational speed range where this technology can be used may be limited. Even if a glass substrate having excellent flatness is used, the disk surface vibration characteristics may be reduced to a range from about 20 μm to about 50 μm. In this case, for example, the maximum surface vibration acceleration at 10,000 rpm (maximum amplitude of frequency element less than 1.6 kHz) becomes in the order of several tens m/s$^2$.

Further, the configuration as described in Patent Document 3 may be applied to a recording/reproducing method for disks that can be used only when the distance between the recording/reproducing head and the surface of the disk is relatively short. Therefore, it may be extremely difficult to apply this configuration (method) to a disk in which the recording/reproducing head is optically and macroscopically separated from the surface of the disk during operations. Even if the configuration of Patent Document 3 is modified so as to be applied to an optical disk, it may become necessary to form an opening through which two flexible disks are inserted to be installed in a position closer to the recording/reproducing head in the flat stabilization member for stabilizing the recording disks. Therefore, the opening may cause air disturbance which may limit the fast rotational speed of the disks and may not provide the desired characteristics when the fast-driven disk exceeds, for example, 10,000 rpm.

SUMMARY OF THE INVENTION

According to an embodiment of the present invention, a recording/reproducing apparatus and a recording/reproducing method may be provided capable of controlling the rotational speed of a recording disk and stabilizing the surface vibration based on the consideration of the load of the spindle motor, when the recording disk is being rotated fast and the rotational speed is controlled.

According to an aspect of the present invention, there is provided a recording/reproducing apparatus including a spindle motor unit including a spindle on which a flexible recording disk is placed to be rotated so that information data are at least one of recorded onto and reproduced from the recording disk. The recording/reproducing apparatus further includes a stabilizer plate disposed so as to face the recording disk, a torque detection unit configured to detect a drive torque applied to the spindle motor unit, an adjustment unit configured to adjust a gap between the recording disk and the stabilizer plate, and a determination unit for determining an optimal gap to be set to the gap based on the drive torque detected by the torque detection unit. By having the configuration, the adjustment unit sets the optimum gap determined by the determination unit to the gap.

According to another aspect of the present invention, there is provided a recording/reproducing apparatus including a spindle motor unit including a spindle on which a flexible recording disk is placed to be rotated so that information data are at least one of recorded onto and reproduced from the recording disk. The recording/reproducing apparatus further includes a stabilizer plate disposed so as to face the recording disk, a rotational speed detection unit configured to detect a rotational speed of the recording disk, an adjustment unit configured to adjust a gap between the recording disk and the stabilizer plate, and a determination unit configured to determine an optimal gap to be set to the gap based on the rotational speed that changes as the gap is gradually reduced by the adjustment unit.

According to still another aspect of the present invention, there is provided a recording/reproducing method in which information data are at least one of recording onto and reproducing from a flexible recording disk placed on a spindle of a spindle motor unit by rotating the recording disk. The method includes an adjustment step of adjusting a gap which is a distance between a stabilizer plate and the recording disk, a torque detection step of detecting a drive torque applied to the spindle motor unit, and a determination step of determining an optimum gap to be set to the gap based on the drive torque detected in the torque detection step. In the adjustment step of this method, the optimum gap determined in the determination step is set to the gap.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In the following, embodiments of the present invention are described with reference to accompanying drawings.

First Embodiment

Before describing a first embodiment, the experiments and comments on the experiments are described.

Figure 1:
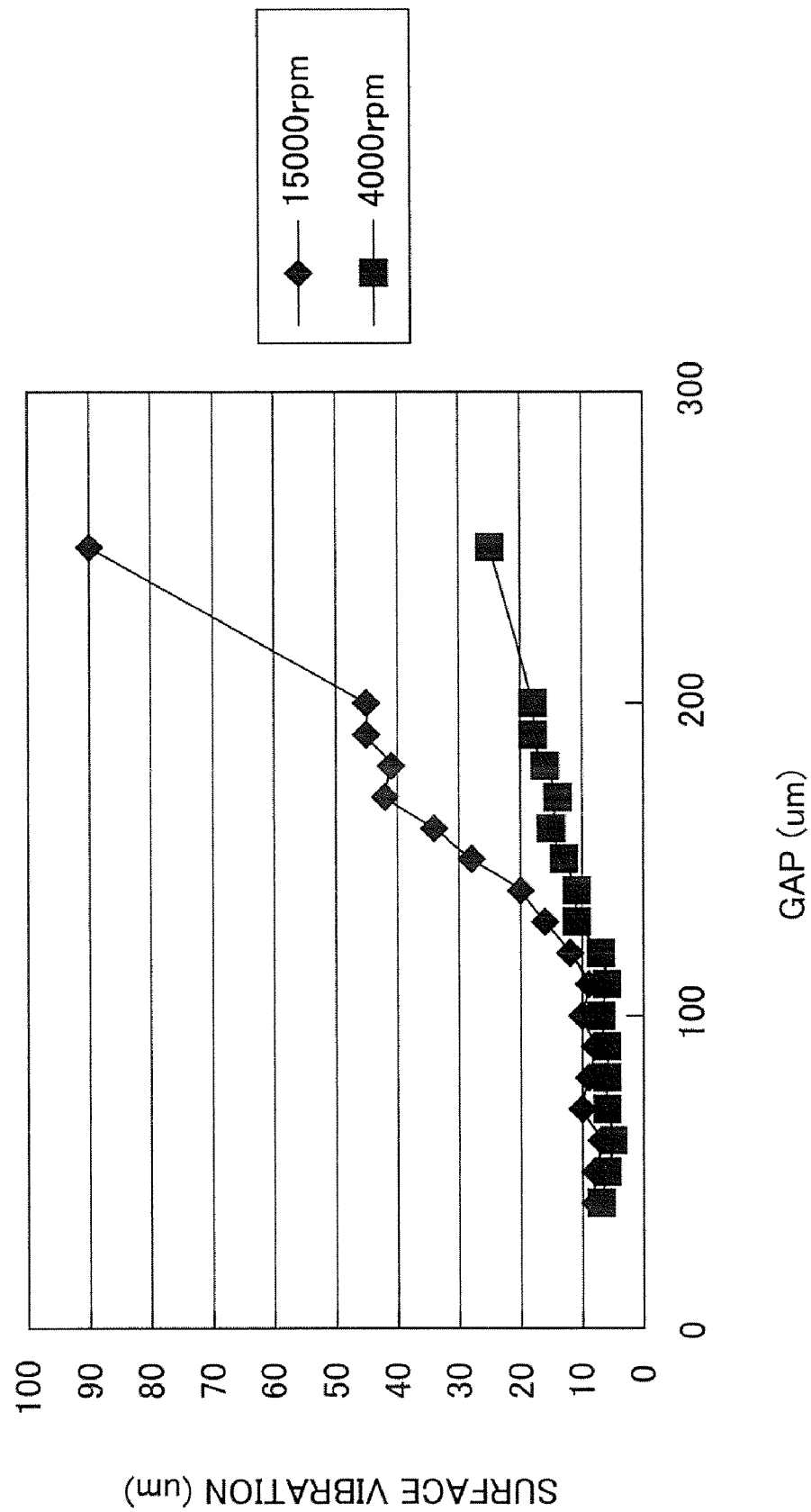
FIG. 1 is a drawing showing a relationship between a gap and a surface vibration.
Figure 2:
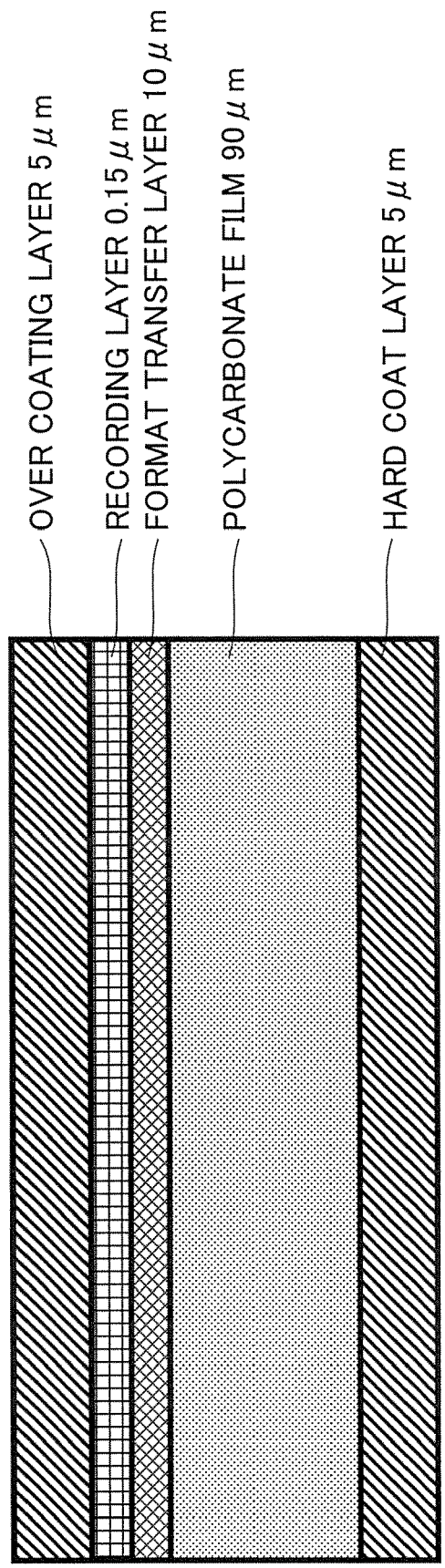
FIG. 2 is a drawing showing an exemplary configuration of a recording disk.

FIG. 1 shows a relationship between a gap (a distance between the disk and the stabilization member) and the amount of the surface vibration (hereinafter may be simplified as "surface vibration") when a recording disk shown in FIG. 2 is used. FIG. 2 shows a configuration of the recording disk. The recording disk has a diameter 120 mm and a thickness about 110 μm and made of polycarbonate. As shown in FIG. 2, from a side facing an optical pickup to a side facing a stabilization member (stabilizer), the recording disks includes a hard coat layer (5 μm in thickness), a polycarbonate film (90 μm), a format transfer layer (10 μm), a recording layer (0.15 μm), and an over coating layer (5 μm).

Referring back to FIG. 1, FIG. 1 shows the changes of the amounts of surface vibration when the disk in FIG. 2 rotates at 15,000 rpm and 4,000 rpm, respectively. As shown in FIG. 1, when the disk rotates at 4,000 rpm, the change of gap does not significantly influence the surface vibration. On the other hand when the disk rotates at high speed 15,000 rpm and the gap is greater than a certain value, the surface vibration increases remarkably. These results show that when the disk rotates at high speed, it may be effective to reduce the gap to reduce the amount of the surface vibration.

Figure 3:
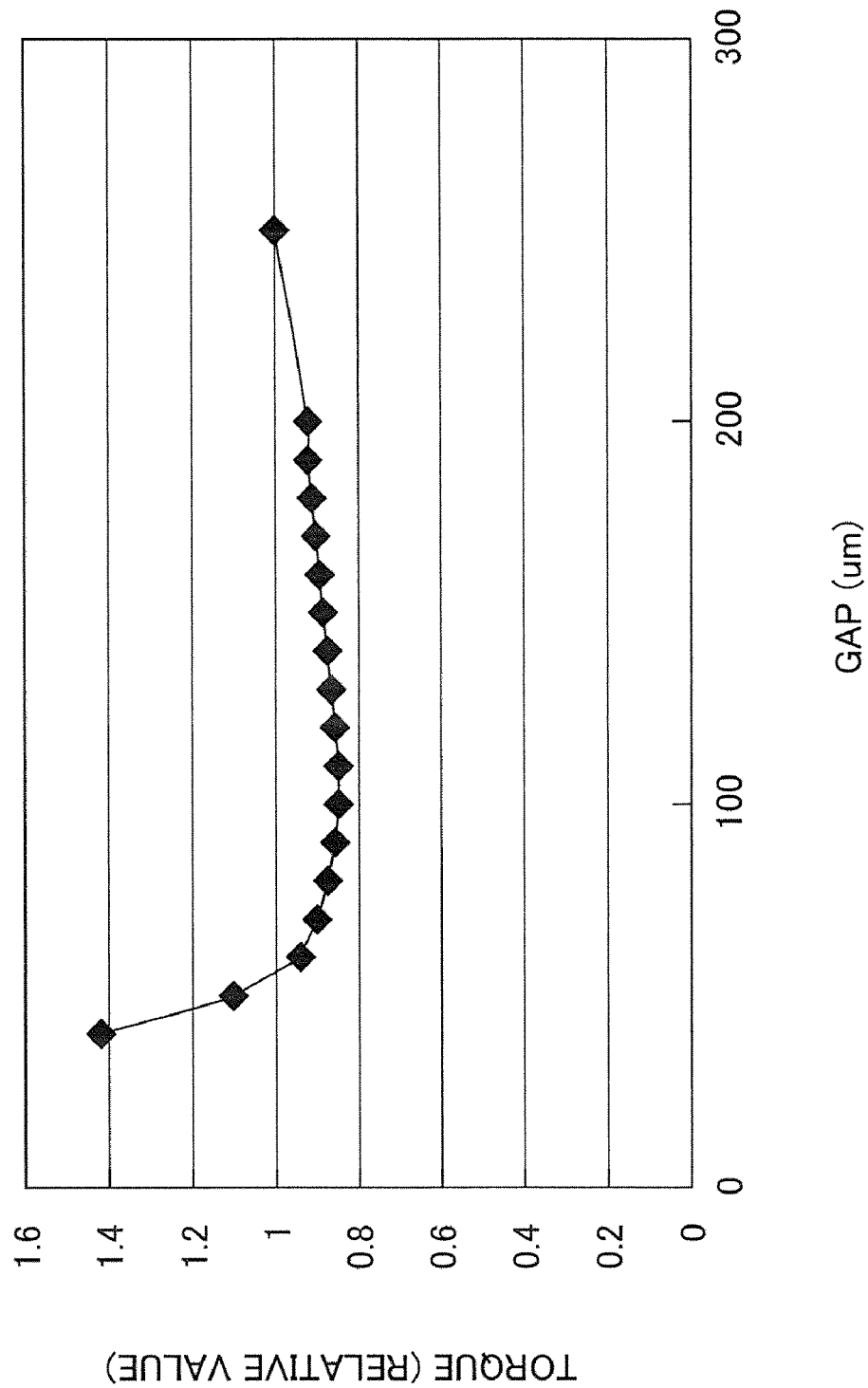
FIG. 3 is a drawing showing a relationship between a drive torque of a spindle motor and the gap.

FIG. 3 shows a relationship between the drive torque of a spindle motor and the gap. In this case as well, the recording disk in FIG. 2 is used. In FIG. 3, the data of the drive torque are relative values acquired by changing the gap by 10 μm every 0.4 seconds, assuming that the value of the drive torque is defined as 1 at which the rotational speed is 15,000 rpm, the gap is 250 μm, and power applied to the spindle motor is 60 W (hereinafter referred to as "reference drive torque").

While being rotated, the recording disk receives friction torque due to viscous air friction. It may be thought that the narrower the gap is, the greater the viscous resistance (viscous air friction) becomes. However, as shown in FIG. 3, when the gap is in a range greater than about 100 μm, the closer the gap is to 100 μm, the less the drive torque becomes. This is because, when the gap is large, the surface vibration may not be better controlled by the stabilizer. As a result, the recording disk may rotate with larger surface vibration and receive more air friction.

On the other hand, when the gap is less than about 100 μm, the smaller the gap is, the more drive torque becomes necessary. Further, as shown in FIG. 3 when the gap becomes less than about 60 μm or about 70 μm, the drive torque largely increases as the gap decreases.

Figure 4:
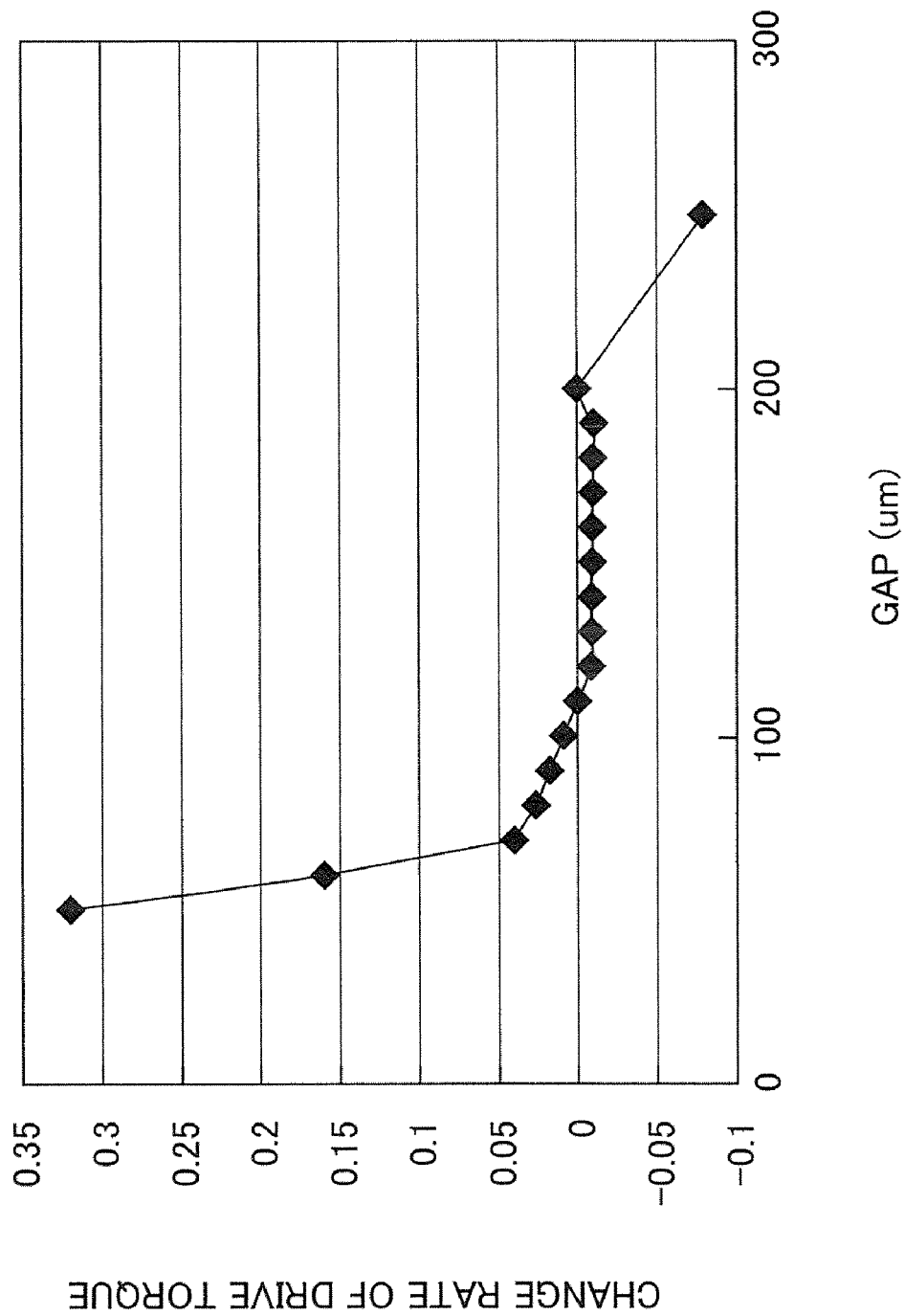
FIG. 4 is a drawing showing a relationship between a change rate of a drive torque of a spindle motor and the gap.

FIG. 4 shows a relationship between a change rate of the drive torque of the spindle motor and the gap. In this case as well, the recording disk in FIG. 2 is used. In FIG. 4, the change rate of the drive torque is calculated as the gap is gradually changed by 10 μm under the conditions as shown in FIG. 3. The positive values of the change rate indicate that the drive torque increases. As described with reference to FIG. 3, when the gap becomes less than about 60 μm or about 70 μm, the drive torque rapidly increases as the gap decreases.

As FIGS. 1, 3, and 4 show, generally, the surface vibration is likely to be stabilized as the gap decreases. However, when the gap becomes too narrow, the drive torque increases, which makes it difficult to increase the rotational speed of the recording disk and burdens the spindle motor with a heavy load.

As a result, in a first embodiment of the present invention, attention is paid to the change rate of the drive torque, and based on the change rate of the drive torque, an appropriate gap is determined. By operating in this way, namely, by determining the appropriate gap based on the change rate of the drive torque, it may become possible to perform stable rotary driving of the recording disk, while considering the load of the spindle motor.

Figure 5:
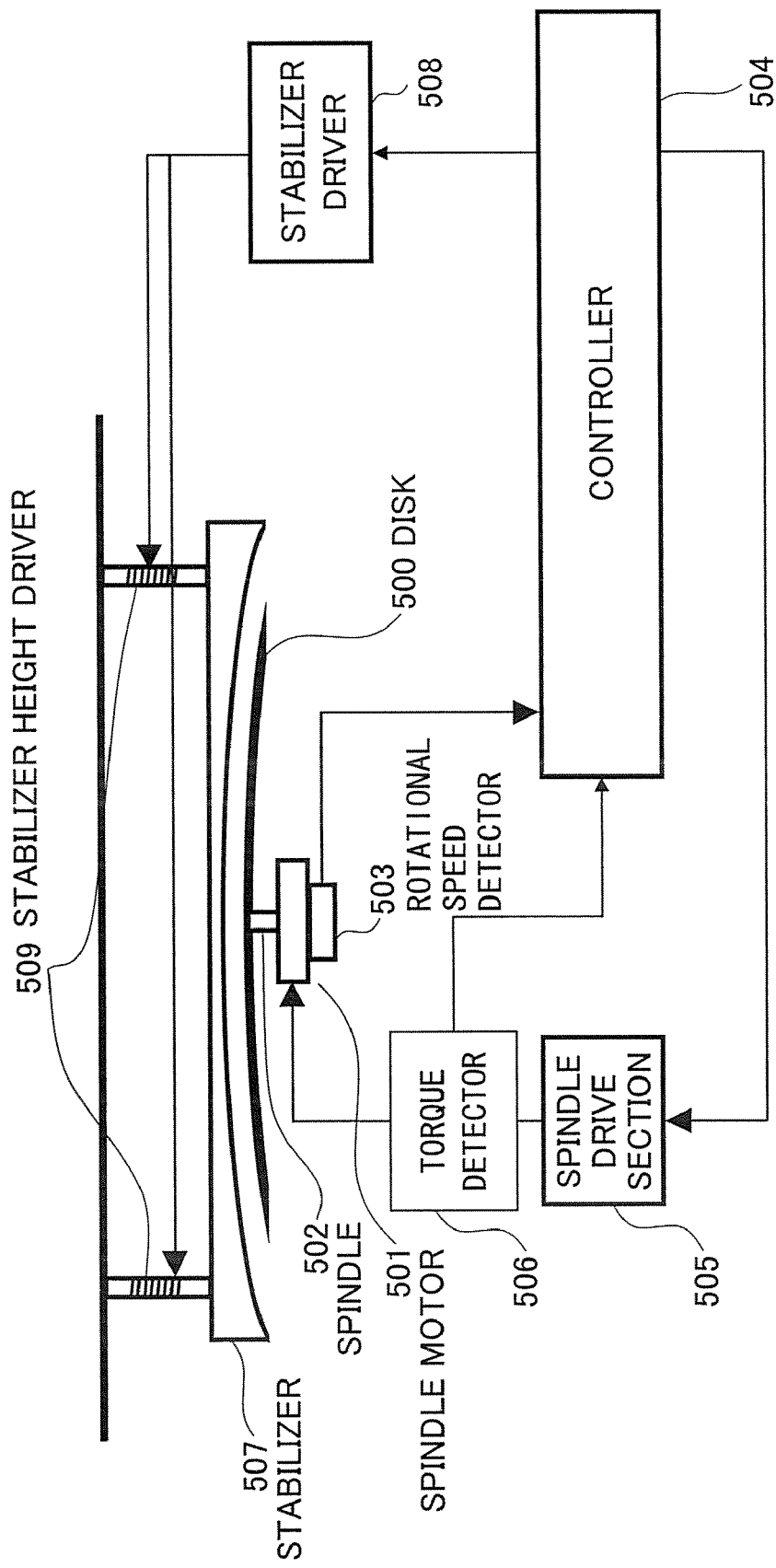
FIG. 5 is a schematic block diagram showing a main part of a recording/reproducing apparatus according to an embodiment of the present invention, the apparatus using a recording disk.

FIG. 5 is a block diagram schematically showing a main part of a recording/reproducing apparatus according to the first embodiment of the present invention. As shown in FIG. 5, the recording/reproducing apparatus includes a disk 500, a spindle motor 501, a spindle 502, a rotational speed detector 503, a controller 504, a spindle drive section 505, a torque detector 506, a stabilizer 507, a stabilizer driver 508, and a stabilizer height driver 509. Herein, the term "recording/reproducing apparatus" refers to a recording and/or a reproducing apparatus, collectively representing a recording and reproducing apparatus, a recording apparatus, and a reproducing apparatus.

Herein, an optical disk is collectively described as the disk 500. However, the disk 500 may be any disk-shaped medium including, but not limited to, a phase-change memory, a magneto-optical memory, and a holographic memory. The disk 500 is placed on the spindle 502 and is rotated by the spindle motor 501.

As the spindle motor 501, for example, a DC (Direct Current) servo motor may be used. Once the target rotational speed is set, the spindle motor 501 is controlled to continue to rotate the disk 500 at the target rotational speed. Further, as the spindle motor 501, for example, an AC (Alternating Current) servo motor or a PLL (Phase Locked Loop) control motor may be used. The spindle 502 serves as an axle to hold the disk 500. The rotational speed detector 503 detects the rotational speed of the disk 500 and outputs the corresponding rotational speed to the controller 504.

The controller 504 controls (sends an instruction to) the stabilizer driver 508 so as to adjust the gap, which is a distance between the stabilizer 507 and the disk 500, based on the rotational speed of the disk 500 and the drive torque of the spindle 502. Further, the controller 504 controls the spindle drive section 505 so that the disk 500 rotates at the target rotational speed based on the rotational speed of the disk 500 detected by the rotational speed detector 503.

Based on the instruction from the controller 504, the spindle drive section 505 controls the rotation of the spindle motor 501. The torque detector 506 monitors power consumption of the spindle drive section 505 and outputs the value of the detected drive current applied to the spindle 502 to the controller 504. As a method of detecting the drive current, a resistor may be connected in series with the spindle motor 501, so that the voltage drop across the resistor is detected using an operational amplifier and A/D converter.

The stabilizer 507 serving as the stabilization member is provided so that the disk 500 can rotate with aerodynamically stable surface vibration. The stabilizer 507 shown in FIG. 5 has a curved shape. However, the stabilizer 507 may have, for example, a straight shape.

Upon receiving the instruction from the controller 504, the stabilizer driver 508 controls the stabilizer height driver 509 to adjust the height (position) of the stabilizer 507. The stabilizer height driver 509 has a mechanism for adjusting the distance (gap) between the disk 500 and the stabilizer 507 and is controlled by the stabilizer driver 508.

Further, FIG. 5 does not include some elements such as an OPU (Optical Pickup Unit) and a signal demodulation system that are generally included in a typical recording/reproducing apparatus. However, herein, it is assumed that the recording/reproducing apparatus according to the first embodiment of the present invention includes such elements even though the elements are not shown in FIG. 5.

Figure 6:
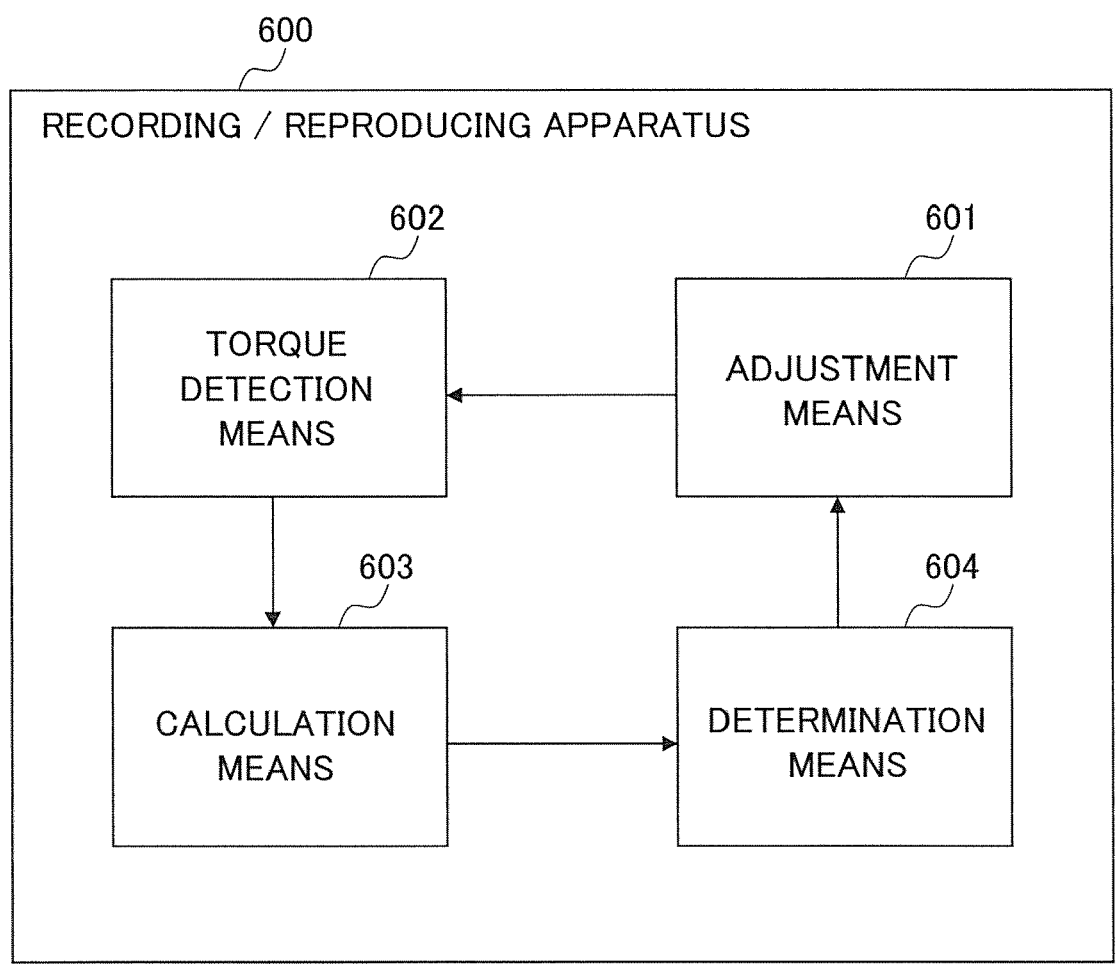
FIG. 6 is a functional block diagram for adjusting the gap in a recording/reproducing apparatus 600 according to a first embodiment of the present invention.

FIG. 6 is a functional block diagram showing means for adjusting the gap in a recording/reproducing apparatus 600 according to the first embodiment of the present invention. As shown in FIG. 6, the recording/reproducing apparatus 600 includes adjustment means 601, torque detection means 602, calculation means 603, and determination means 604.

The adjustment means 601 adjusts the gap which is the distance between the recording disk 500 and the stabilizer 507. In this case, the adjustment means 601 gradually reduces the gap and sends the result (reduced gap) to the torque detection means 602. By operating in this way, namely, by gradually reducing the gap, it may become easier for the torque detection means 602 to detect the drive torque. However, the adjustment means 601 may consecutively reduce the gap.

Once an optimum gap is determined by the determination means 604 described below, the adjustment means 601 adjusts and fixes the gap to the optimum gap. In other words, the determined optimum gap is set as the gap between the recording disk 500 and the stabilizer 507. On the other hand, when receiving the information that the optimal gap has not been determined by the determination means 604, the adjustment means 601 reduces the gap by the predetermined unit.

Upon receiving information that the gap has been reduced by the predetermined unit from the adjustment means 601, the torque detection means 602 detects the drive torque applied to the spindle motor 501 based on the drive current applied to the spindle motor, and outputs the detected drive torque to the calculation means 603. When a DC motor is used as the spindle motor 501, the relationship between the power consumption and the drive torque becomes substantially proportional. By using this relationship, it may become possible to detect the drive torque by detecting the drive current. This substantially proportional relationship between the power consumption and the drive torque may be observed not only when a DC servo motor is used but also when an AC servo motor or a PLL control motor is used. Therefore, an AC servo motor or a PLL control motor may also be used as the spindle motor 501.

The calculation means 603 calculates a rate of change of the detected drive torque between the torque detected by the torque detection means 602 and a reference drive torque. Further, the calculation means 603 outputs the calculated rate of change of the drive torque to the determination means 604.

Based on the rate of change calculated by the calculation means 603, the determination means 604 determines the optimum gap to be fixed (set) to the gap. A specific process of determining the optimum gap is described below with reference to FIG. 7. When the optimum gap is determined, the determination means 604 outputs the determined value of the optimum gap to the adjustment means 601. However, when the optimum gap is not determined, the determination means 604 outputs the information that the optimum gap has not been determined to the adjustment means 601.

Figure 7:
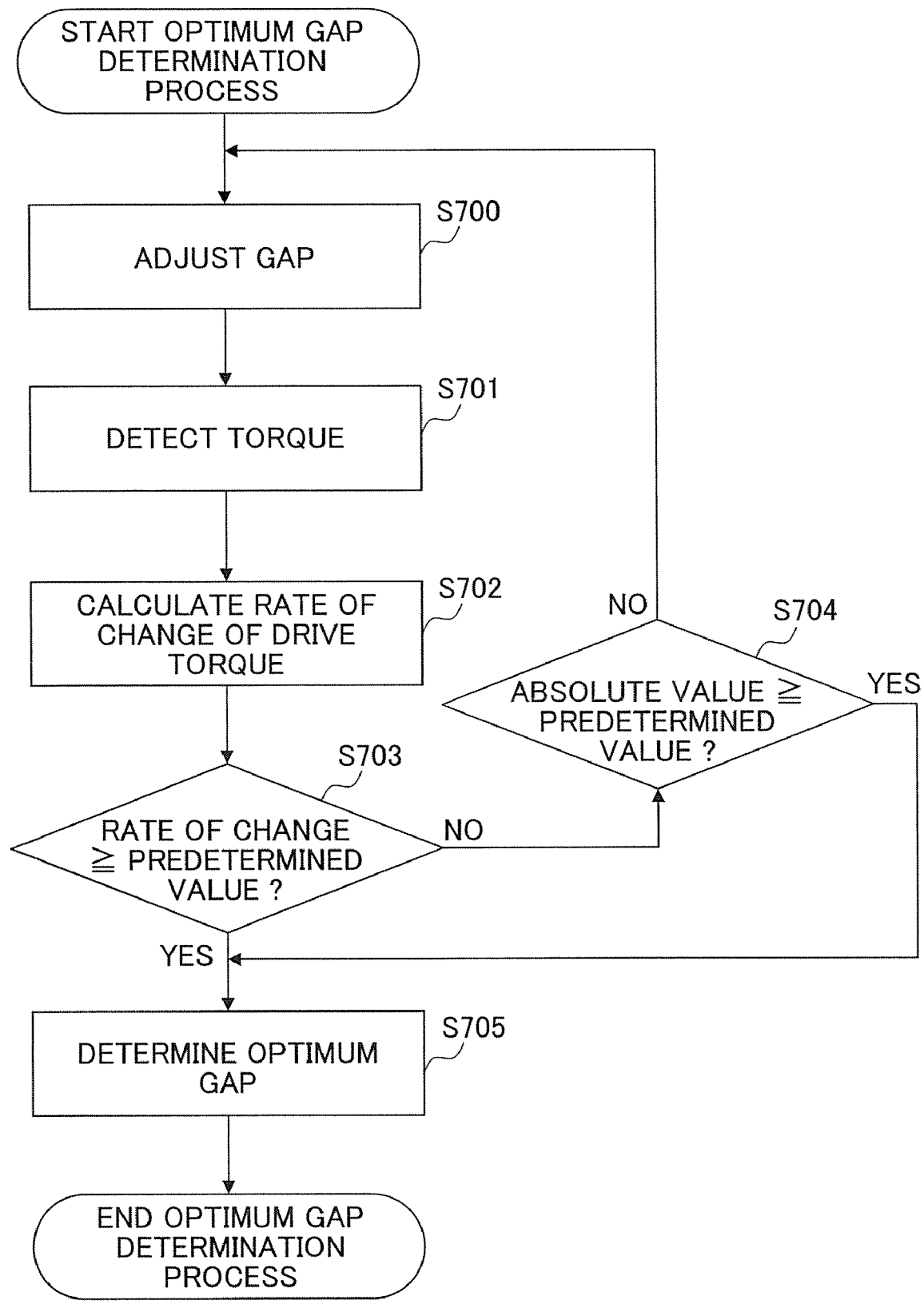
FIG. 7 is a flowchart showing a process of determining an optimum gap according to the first embodiment of the present invention.

FIG. 7 is a flowchart showing a process of determining the optimum gap in this embodiment of the present invention. The process of the flowchart in FIG. 7 is described with reference to graphs in FIGS. 3 and 4. In step S700, the adjustment means 601 reduces the gap by the predetermined unit. In this example, the gap is reduced by 10 μm every 0.4 seconds. After step S700, the process goes to step S701. In step S701, the torque detection means 602 detects the drive torque applied to the spindle motor 501 based on the drive current applied to the spindle motor 501.

After step S701, the process goes to step S702. In step S702, the calculation means 603 calculates the rate of change of the drive torque. In this example, the rate of change is calculated based on the immediately preceding drive torque. Namely, for example, when the current gap is 200 μm, the rate of change of the drive torque is calculated when the gap is changed from 200 μm to 190 μm.

After step S702, the process goes to step S703. In step S703, the determination means 604 determines whether the rate of change calculated by the calculation means 603 is equal to or greater than a predetermined value. The predetermined value in this example is +0.05. When referring to FIG. 4, the rate of change becomes equal to or greater than +0.05 when the gap becomes 60 μm.

When "YES" is determined in step S703, the process goes to step S705. In step S705, the determination means 604 determines the optimum gap based on the gap when determined "YES" in step S703. In this example, the optimum gap is determined by adding 10 μm to the gap when the rate of change of the drive torque becomes equal to or greater than the predetermined value. By operating in this way, it may become possible to reduce the gap as much as possible while maintaining stable drive torque and achieve aerodynamically stable driving to rotate the recording disk 500 in consideration of the load of the spindle motor 501.

When "NO" is determined in step S703, the process goes to step S704. In step S704, the determination means 604 determines whether the absolute value of the drive torque detected by the torque detection means 602 is equal to or greater than a predetermined value. In the example of FIG. 3, the determination means 604 determines whether the detected torque is as high as or greater than 1.4 times the reference torque.

When "YES" is determined in step S704, the process goes to step S705. In step S705, the determination means 604 determines that a gap is the optimum gap when the absolute value of the drive torque of the gap is equal to or greater than the predetermined value. In the example of FIG. 5, fifty (50) μm is determined to become the value of the optimum gap. By operating in this way, it may become possible to avoid the situation where the gap becomes too narrow even when the rate of change of the drive torque does not become equal to or greater than the predetermined value.

As described above, according to the first embodiment of the present invention, it may become possible to rotate the recording disk 500 with aerodynamically stable surface vibration characteristics in consideration of the load of the spindle motor 501 when the recording disk 500 is driven to rotate at high rotational speed.

Further, in the first embodiment of the present invention, the optimum gap is determined by using not the absolute value of the drive torque but the rate of change of the drive torque calculated while gradually reducing the gap. This is because, by using the rate of change of the drive torque, it may become possible to be less affected by the variation across each disk. If the absolute value of the drive torque is used, the result may be affected by the variation across each disk because the relationship between the absolute value of the drive torque and the gap varies across each disk due to, for example, different warpage for each disk. Further, according to the embodiment of the present invention, the optimum gap is determined by the rate of change of the drive torque. Therefore the result may not depend upon the mechanical accuracy alone, and the influences of acceptable mechanical accuracy and over time may be reduced.

In the first embodiment of the present invention, when a PWM (Pulse Width Modulation) drive is used for driving the spindle motor 501, greater noise may be generated and present in the current. Therefore, a low pass filter may be preferably used to perform a smoothing process before A-D conversion is performed. By operating in this way, it may become possible to reduce the error in detecting the current value.

Further, in the first embodiment of the present invention described above, the adjustment means 601 notifies the torque detection means 602 that the gap has been reduced, and when the notice is sent from the adjustment means 601 to the torque detection means 602, the drive torque is detected. However, instead, the adjustment means 601 may not notify the torque detection means 602 that the gap has been reduced, and the torque detection means 602 may continually detect the drive torque. This modified configuration may also be applied to any of the following embodiments and modified embodiments.

Modified Embodiment

Figure 8:
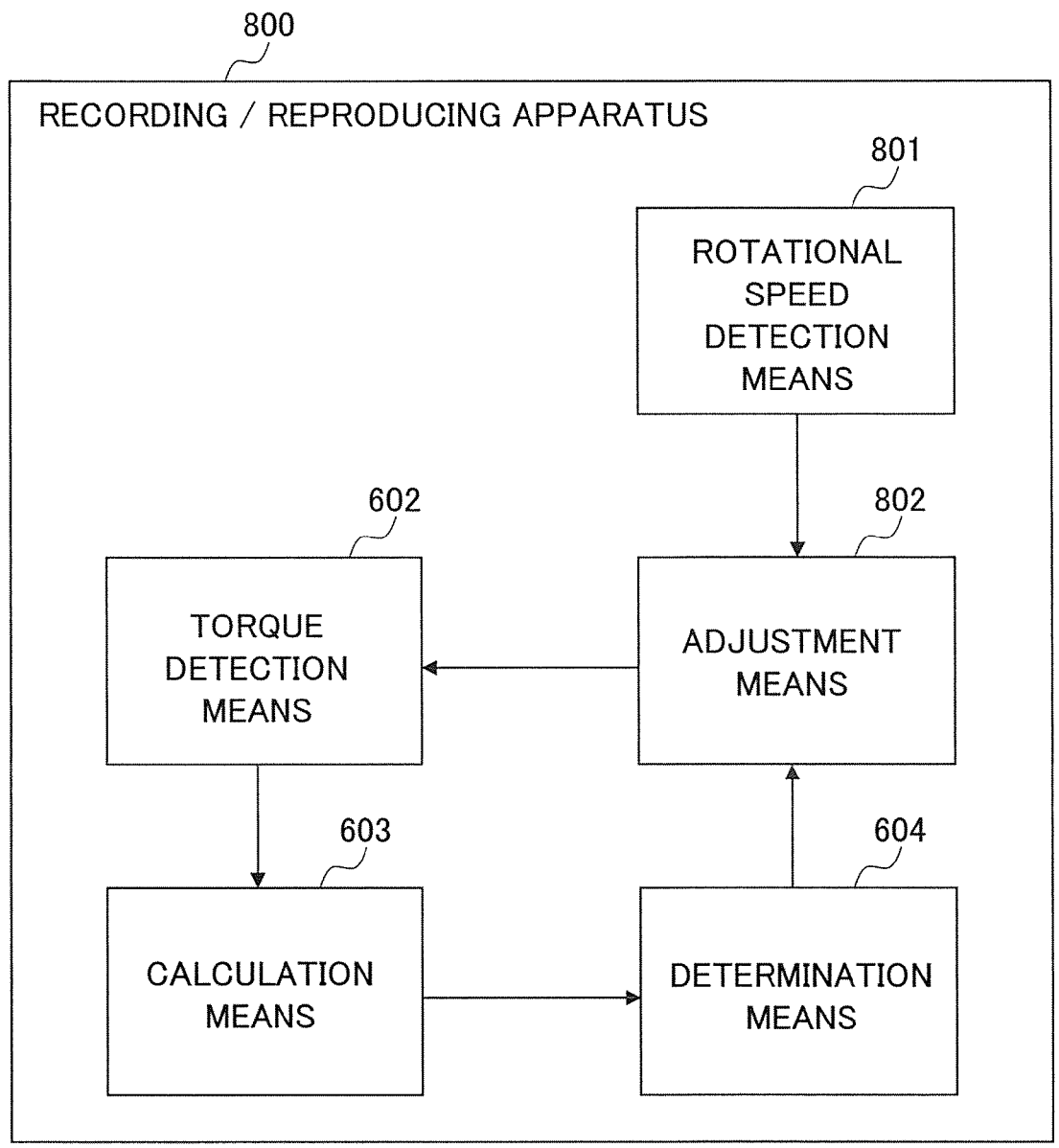
FIG. 8 is a functional block diagram of a recording/reproducing apparatus according to a modified first embodiment of the present invention.

FIG. 8 is a functional block diagram showing a modified configuration of a recording/reproducing apparatus 800 according to a modified first embodiment of the present invention. In this modified first embodiment, to perform a preprocessing operation before performing the process of determining the optimum gap described in the above first embodiment of the present invention, there is further provided rotational speed detection means 801 added to the configuration of the recording/reproducing apparatus shown in FIG. 6. This preprocessing operation refers to an operation to increase (widen) the gap until the rotational speed of the recording disk 500 reaches a predetermined value.

In FIG. 8, the same numerals are used to designate the same or similar elements in FIG. 6, and the descriptions thereof are omitted. The rotational speed detection means 801 detects the rotational speed of the recording disk 500 and outputs the detected rotational speed to adjustment means 802.

When the recording disk 500 is attached to the spindle 501, the adjustment means 802 sets the gap to, for example, 5 mm. Then, when the rotational speed detected by the rotational speed detection means 801 reaches 4,000 rpm, the adjustment means 802 sets the gap to, for example, 250 μm.

Further, when the rotational speed detected by the rotational speed detection means 801 reaches, for example, 15,000 rpm, the adjustment means 802 starts reducing the gap to determine and adjust to the optimum gap and notifies the torque detection means 602 of the adjusted result (gap).

Figure 9:
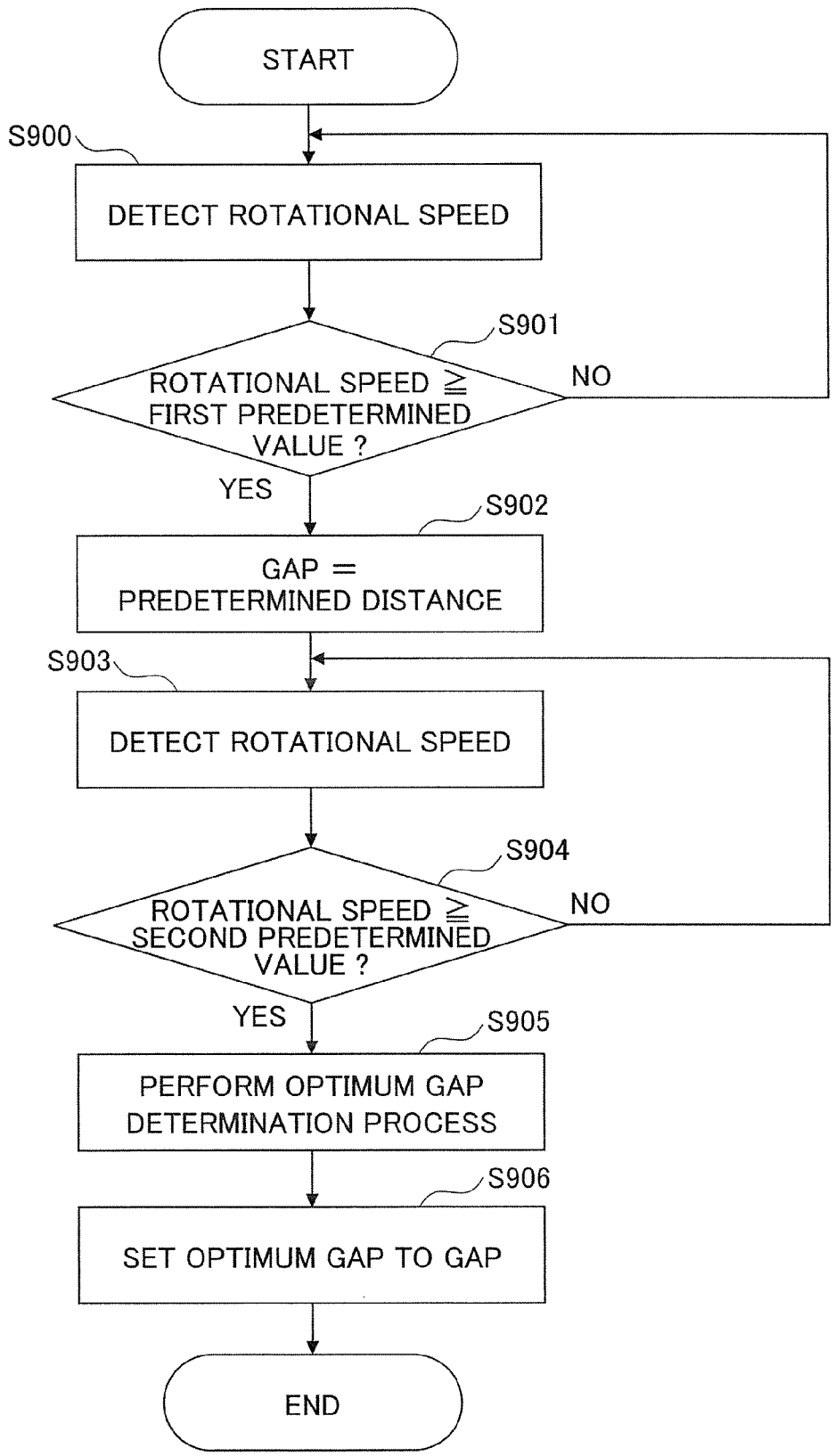
FIG. 9 is a flowchart showing a process from starting the rotation of the recording disk to determining the optimum gap according to the modified first embodiment of the present invention.

FIG. 9 is a flowchart showing a process from starting the rotation of the recording disk 500 to determining the optimum gap. In step 900, the rotational speed detection means 801 detects the rotational speed of the recording disk 500 and outputs the detected rotational speed to the adjustment means 802. After step S900, the process goes to step S901. In step S901, the adjustment means 802 determines whether the acquired (detected) rotational speed is equal to or greater than a first predetermined value, for example 4,000 rpm. When "NO" is determined in step S901, the process goes back to step S900.

When "YES" is determined in step S901, the process goes to step S902. In step S902, the adjustment means 802 adjusts and sets the gap to a predetermined distance, for example, 250 μm. After step S902, the process goes to step S903. In step S903, the rotational speed detection means 801 detects the rotational speed of the recording disk 500 and outputs the detected rotational speed to the adjustment means 802.

After step S903, the process goes to step S904. In step S904, the adjustment means 802 determines whether the acquired (detected) rotational speed is equal to or greater than a second predetermined value, for example 15,000 rpm. When "NO" is determined in step S904, the process goes back to step S903.

When "YES" is determined in step S904, the process goes to step S905 to perform the process for determining the optimum gap shown in FIG. 8. After step S905, the process goes to step S906. In step S906, the adjustment means 802 adjusts and fixes the gap to be the determined optimum gap (i.e., the determined optimum gap is set as the gap).

As described above, according to this first modified embodiment of the present invention, it may become possible to avoid the contact between the recording disk 500 and the stabilizer 507 and perform stable rotation driving with respect to the recording disk 500 from when the rotation of the recording disk 500 is started. Further, when the rotation of the recording disk 500 is to be stopped, by performing the reverse process from step S904 shown in FIG. 9, similar to the case where the rotation of the recording disk 500 is started, it may become possible to avoid the contact between the recording disk 500 and the stabilizer 507 and perform stable rotation driving with respect to the recording disk 500.

Second Embodiment

In the following, a recording/reproducing apparatus according to a second embodiment of the present invention is described. In this second embodiment, the optimum gap is determined based on the change of the rotational speed of the recording disk 500.

Figure 10:
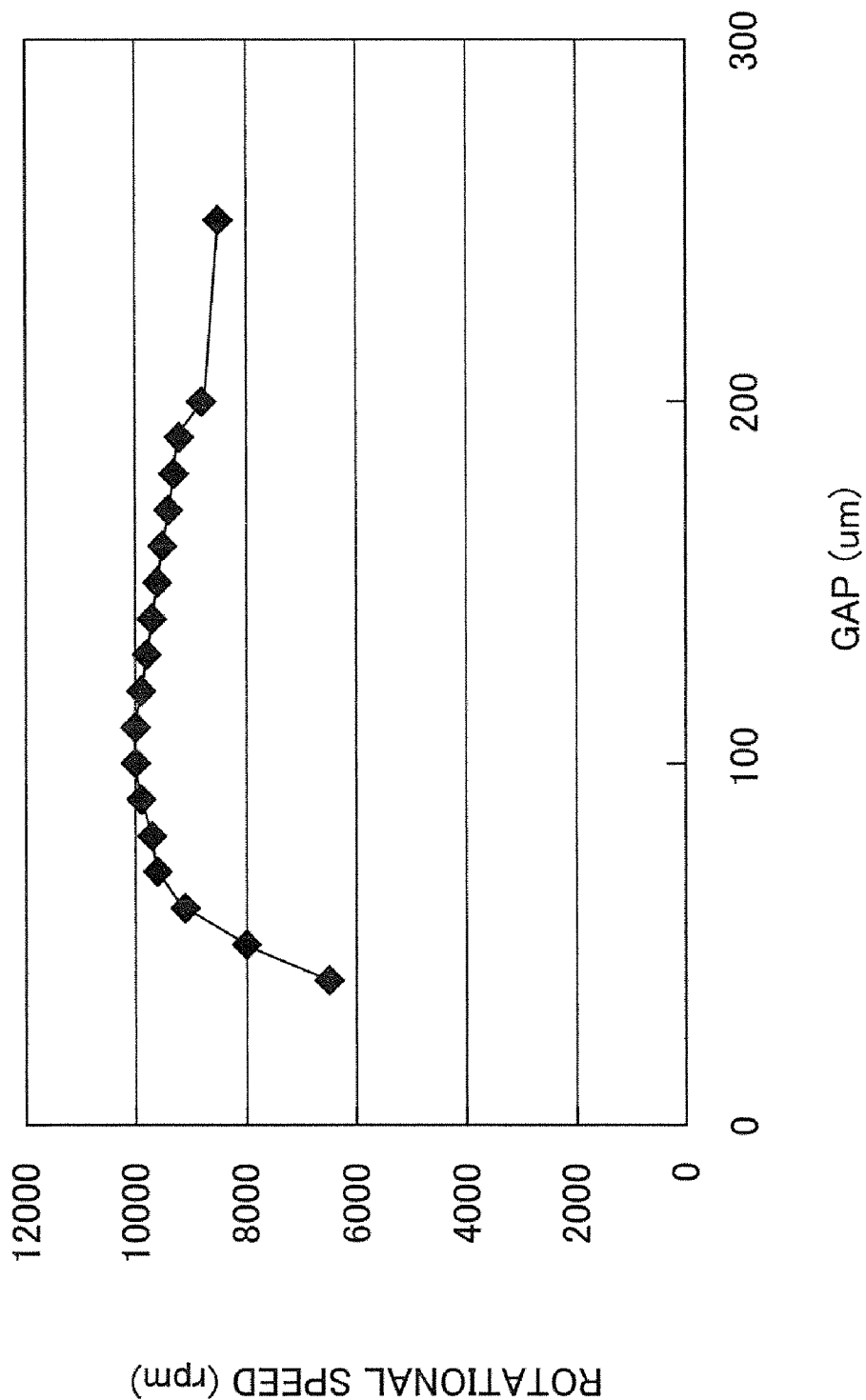
FIG. 10 is a drawing showing a relationship between the gap and a rotational speed.

First, a relationship between the gap and the rotational speed is described with reference to FIG. 10. FIG. 10 shows the relationship between the gap and the rotational speed when the gap is set to 100 μm and a current or a voltage is set so that the recording disk 500 shown in FIG. 2 rotates at 10,000 rpm.

As shown in FIG. 10, when the gap becomes equal to or less than about 100 μm, the rotational speed decreases. Further, when the gap becomes less than about 40 μm, the spindle 502 stops. This stopping of the spindle 502 occurs because a deformed innermost part of the recording disk 500 starts sliding toward the stabilizer 507 due to the fact that the gap becomes too narrow.

Therefore, in this second embodiment, the optimum gap is determined based on a gap when the rotational speed greatly increases.

Figure 11:
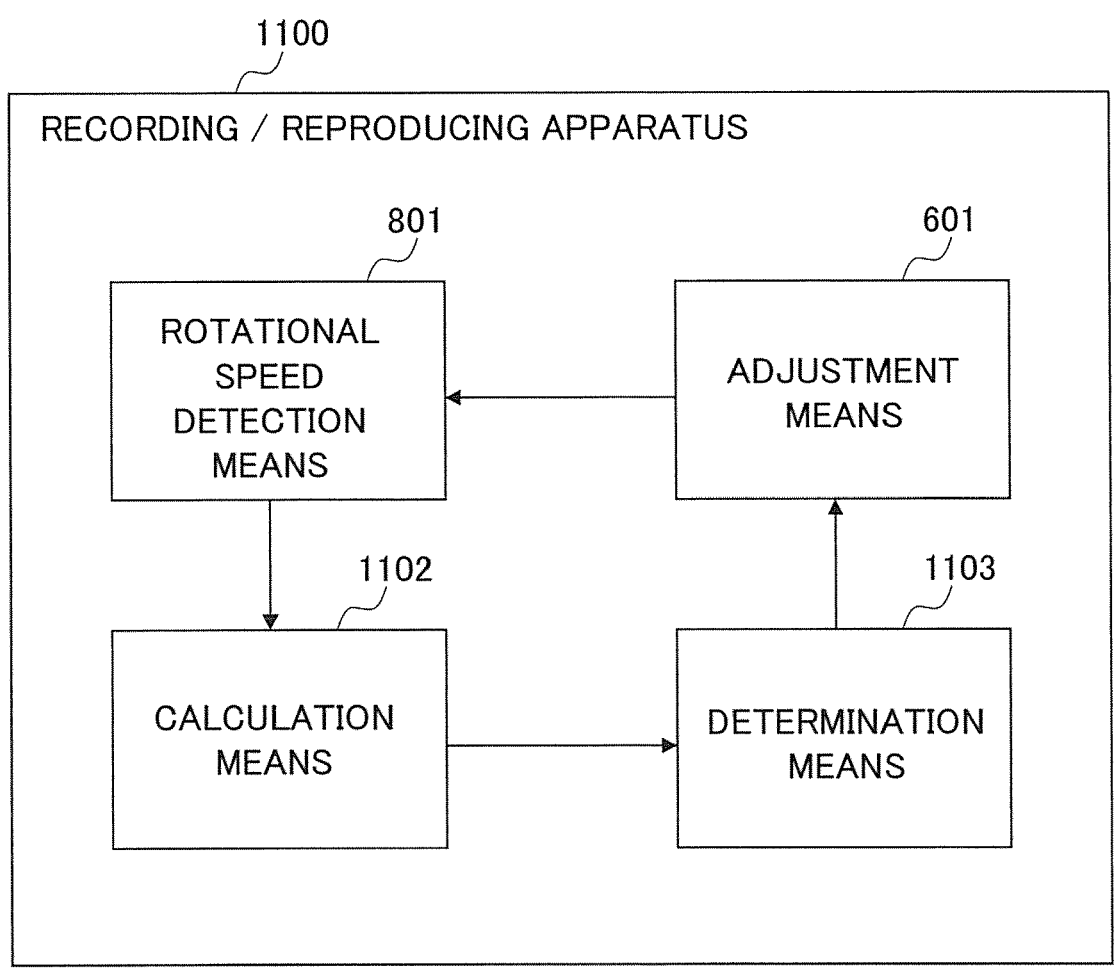
FIG. 11 is a functional block diagram showing a recording/reproducing apparatus 1100 according to a second embodiment of the present invention.

FIG. 11 is a functional block diagram showing a modified configuration of a recording/reproducing apparatus 1100 according to the second embodiment of the present invention. As shown in FIG. 11, the recording/reproducing apparatus 1100 includes the adjustment means 601, the rotational speed detection means 801, calculation means 1102, and determination means 1103. In FIG. 11, the same numerals are used to designate the same or similar elements in FIGS. 6 and 8, and the descriptions thereof are omitted.

The calculation means 1102 calculates a change (difference) between before and after the rotational speeds based on the rotational speed detected by the rotational speed detection means 801.

The determination means 1103 determines the optimum gap based on the change of the rotational speed calculated by the calculation means 1102. Referring to the example of FIG. 10, the determination means 1103 determines a first gap to be the optimum gap when the rotational speed of a second gap decreases by 200 rpm or more compared with the rotational speed of the first gap that is set immediately before the second gap and that is wider than the second gap by 10 μm.

Figure 12:
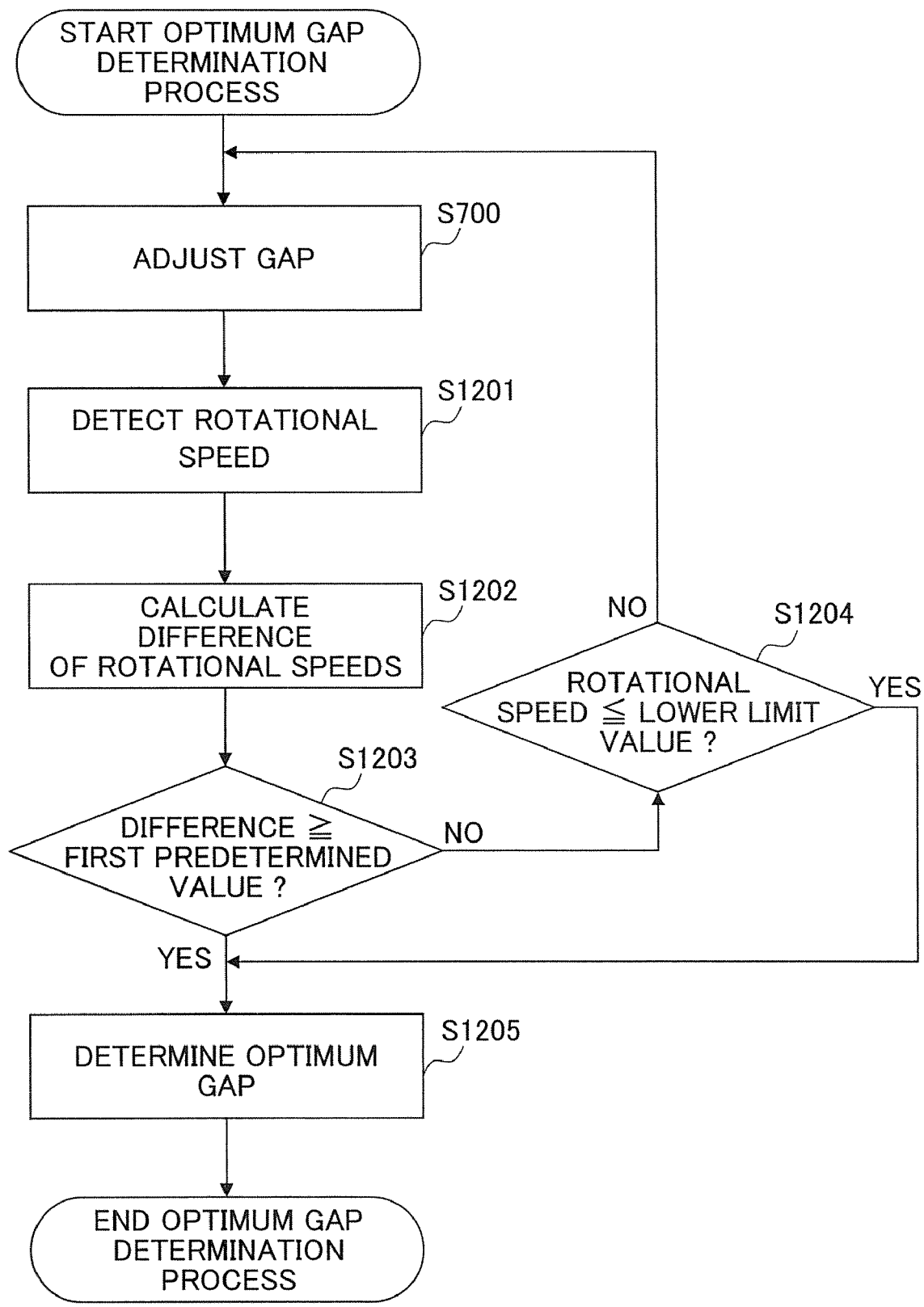
FIG. 12 is a flowchart showing a process of determining the optimum gap according to the second embodiment of the present invention.

FIG. 12 is a flowchart showing a process of determining the optimum gap according to the second embodiment of the present invention. In FIG. 12, the same numerals are used to designate the same or similar processes in FIG. 7, and the descriptions thereof are omitted.

In step S1201, the rotational speed detection means 801 detects the rotational speed of the recording disk 500 and outputs the detected rotational speed to the calculation means 1102. After step S1201, the process goes to step S1202. In step S1202, the calculation means 1102 calculates the difference between the acquired rotational speed (in step S1201) and the rotational speed acquired last time. In this case, the calculation means 1102 calculates the difference between the acquired rotational speed (in step S1201) and the rotational speed acquired last time. However, obviously, the calculation means 1102 may calculate the rate of change between adjoining rotational speeds.

After step S1202, the process goes to step S1203. In step S1203, the determination means 1103 determines whether the difference calculated by the calculation means 1102 is equal to or greater than a first predetermined value. In the example of FIG. 10, the first predetermined value is 200 rpm.

When "YES" is determined in step S1203, the process goes to step S1205. In step S1205, the determination means 1103 determines a first gap to be set as the optimum gap if determined that the rotational speed of a second gap decreases by 200 rpm or more compared with the rotational speed of the first gap, the second gap being the next narrower gap of the first gap. By proceeding in this way, it may become possible to reduce the gap in a range where the rotational speed does not largely decrease and perform stable driving to rotate the recording disk 500 in consideration of the load of the spindle motor 501.

When "NO" is determined in step S1203, the process goes to step S1204. In step S1204, the determination means 1103 determines whether the rotational speed is equal to or less than a lower limit value. In the example of FIG. 10, the lower limit value is set to 8,000 rpm.

When "NO" is determined in step S1204, the process goes back to step S700. On the other hand, When "YES" is determined in step S1204, the process goes to step S1205. In step S1205, the determination means 1103 determines a first gap to be set as the optimum gap when the rotational speed of a second gap is determined to be equal to or less than 8,000 rpm (the lower limit value), the second gap being the next gap of the first gap and narrower than the first gap by 10 μm. In the example of FIG. 10, the optimum gap is determined to be 60 μm.

By proceeding in this way, it may become possible to determine the optimum gap at which the rotational speed is not equal to or less than the lower limit value (for example 8,000 rpm), even when the rotational speed does not largely decrease, and perform stable driving to rotate the recording disk 500.

As described above, according to the second embodiment of the present invention, it may become possible to reduce the gap in a range where the rotational speed does not greatly decrease and perform stable driving to rotate the recording disk 500 in consideration of the load of the spindle motor 501.

Modified Embodiment

Next, a modified second embodiment of the present invention is described. This modified second embodiment is different from the second embodiment in that the optimum gap is determined not based on the change (difference) between before and after rotational speeds but based on a difference from a reference rotational speed.

Figure 13:
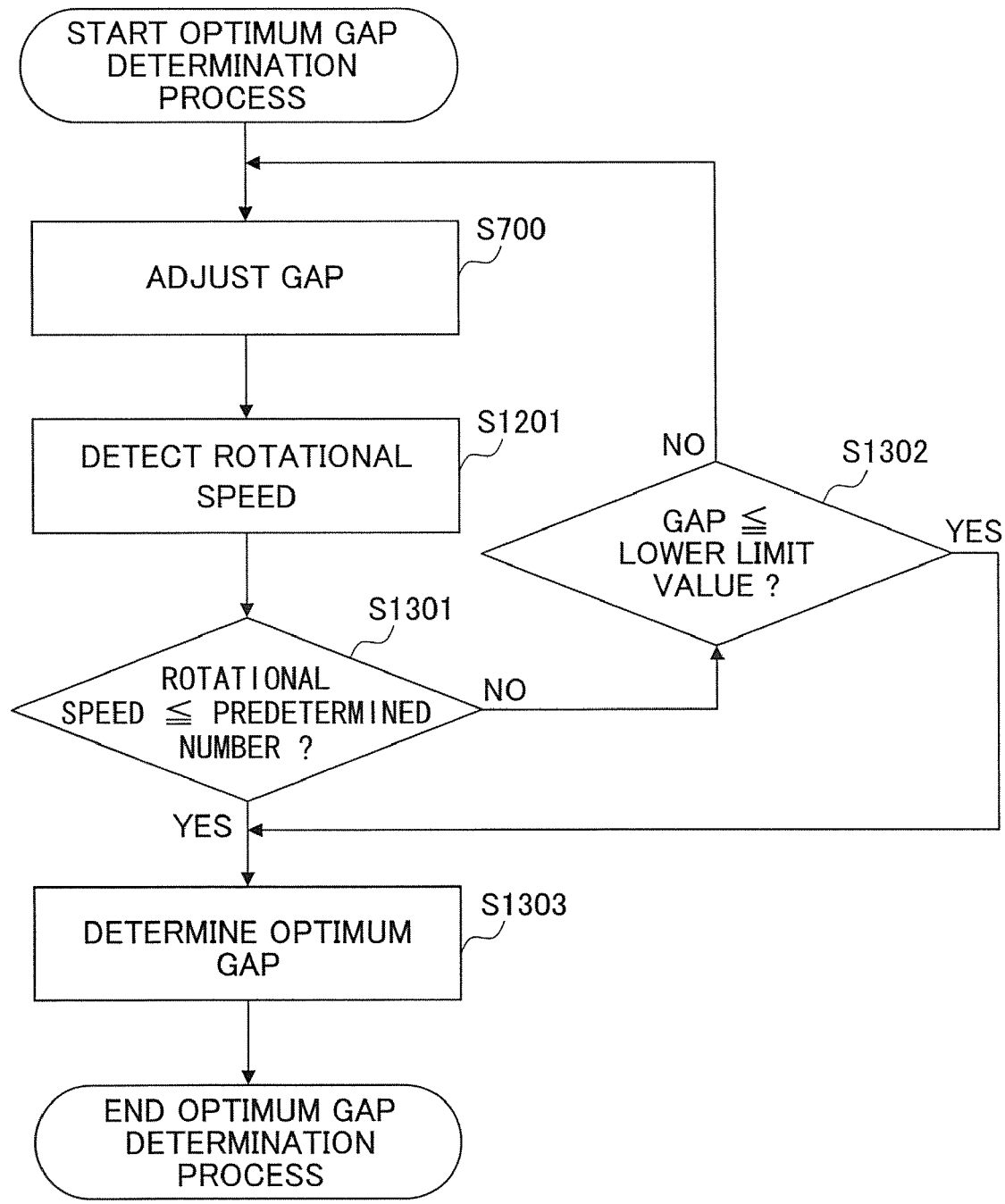
FIG. 13 is a flowchart showing a process of determining the optimum gap according to a modified second embodiment of the present invention.

FIG. 13 is a flowchart showing a process of determining the optimum gap according to the modified second embodiment of the present invention. In FIG. 13, the same numerals are used to designate the same or similar processes in FIGS. 7 and 12, and the descriptions thereof are omitted.

In step S1301, the calculation means 1102 determines whether the acquired (detected) rotational speed is equal to or less than a predetermined number. Herein, the predetermined number refers to a rotational speed which is less than a reference rotational speed by some percentage. In the example of FIG. 10, the reference rotational speed is set to the initial rotational speed which is 10,000 rpm, and the predetermined number is set to 9,000 rpm which is 10% less than 10,000 rpm.

When "YES" is determined in step S1301, the process goes to step S1303. In step S1303, the determination means 1103 determines a first gap to be set as the optimum gap when the rotational speed of a second gap is determined to be equal to or less than 9,000 rpm (the predetermined number), the second gap being the next gap of the first gap and narrower than the first gap by 10 μm. In the example of FIG. 10, the optimum gap is determined to be 60 μm.

By proceeding in this way, the optimum gap is determined based on the gap at which the rotational speed is greatly changed from the reference rotational speed. Therefore, it may become possible to perform stable driving to rotate the recording disk 500 in consideration of the load of the spindle motor 501.

When "NO" is determined in step S1301, the process goes to step S1302. In step S1302, the determination means 1103 determines whether the gap is equal to or less than a lower limit value. In this case, it is assumed that the determination means 1103 acquires the gap from the adjustment means 601.

When "NO" is determined in step S1302, the process goes back to step S700. On the other hand, when "YES" is determined in step S1302, the process goes to step S1303. In step S1303, the determination means 1103 determines the optimum gap based on the lower limit value. In the example of FIG. 10, the lower limit is set to 50 μm, and the optimum gap is determined 60 μm which is obtained by adding 10 μm to the 50 μm. By operating in this way, it may become possible to avoid the sliding of the inner part of the recording disk 500.

Further, the preprocessing operation described in the modified first embodiment of the present invention shown in FIG. 9 may be performed in the second embodiment and the modified second embodiment of the present invention.

Third Embodiment

Figure 14:
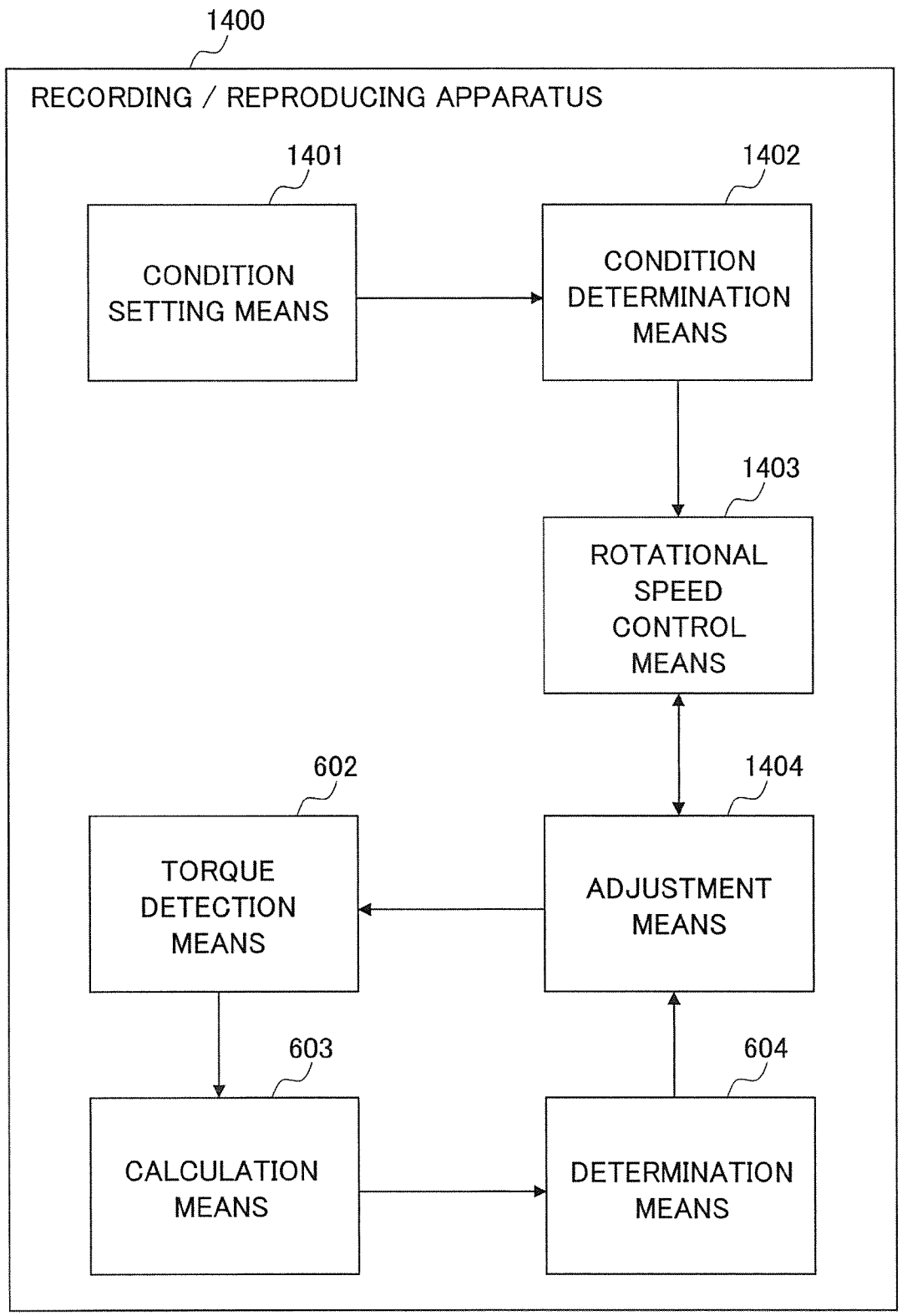
FIG. 14 is a functional block diagram showing a recording/reproducing apparatus 1400 according to a third embodiment of the present invention.

In a recording/reproducing apparatus 1400 according to a third embodiment of the present invention, even in a case where the recording disk 500 stably rotates at a constant rotational speed, when a predetermined condition is satisfied, a process of determining the optimum gap is performed. In FIG. 14, the same numerals are used to designate the same or similar elements in FIG. 6, and the descriptions thereof are omitted.

As shown in FIG. 14, the recording/reproducing apparatus 1400 includes condition setting means 1401, condition determination means 1402, rotational speed control means 1403, adjustment means 1404, the torque detection means 602, the calculation means 603, and the determination means 604.

The condition setting means 1401 sets a predetermined condition to perform the process of determining the optimum gap. However, the number of the predetermined conditions is not limited to one, and more than one condition may be set.

The condition determination means 1402 determines whether the condition set by the condition determination means 1402 is satisfied. When it is determined that the condition is satisfied, the condition determination means 1402 notifies the rotational speed control means 1403 that the condition is satisfied. In a case where there are more conditions than one, when at least one of the conditions is satisfied, it is assumed that the condition is satisfied.

Upon receiving the information that the condition is satisfied from the condition determination means 1402, the rotational speed control means 1403 controls (adjusts) so that the rotational speed of the recording disk 500 is set to, for example, 4,000 rpm. Further, the rotational speed control means 1403 sends an instruction to the adjustment means 1404 to adjust the gap to 250 μm.

Further, upon receiving the information that the gap has been adjusted to 250 μm from the adjustment means 1404, the rotational speed control means 1403 controls (adjusts) so that the rotational speed of the recording disk 500 is set to, for example, 15,000 rpm. Further, the rotational speed control means 1403 sends the information that the rotational speed of the recording disk 500 is set to 15,000 rpm to the adjustment means 1404.

The adjustment means 1404 adjusts the gap to a predetermined gap upon receiving the instruction from the rotational speed control means 1403. Further, the adjustment means 1404 starts reducing the gap by 10 μm every 0.4 seconds to determine the optimum gap upon receiving the information that the rotational speed of the recording disk 500 is set at 15,000 rpm from the rotational speed control means 1403.

Figure 15:
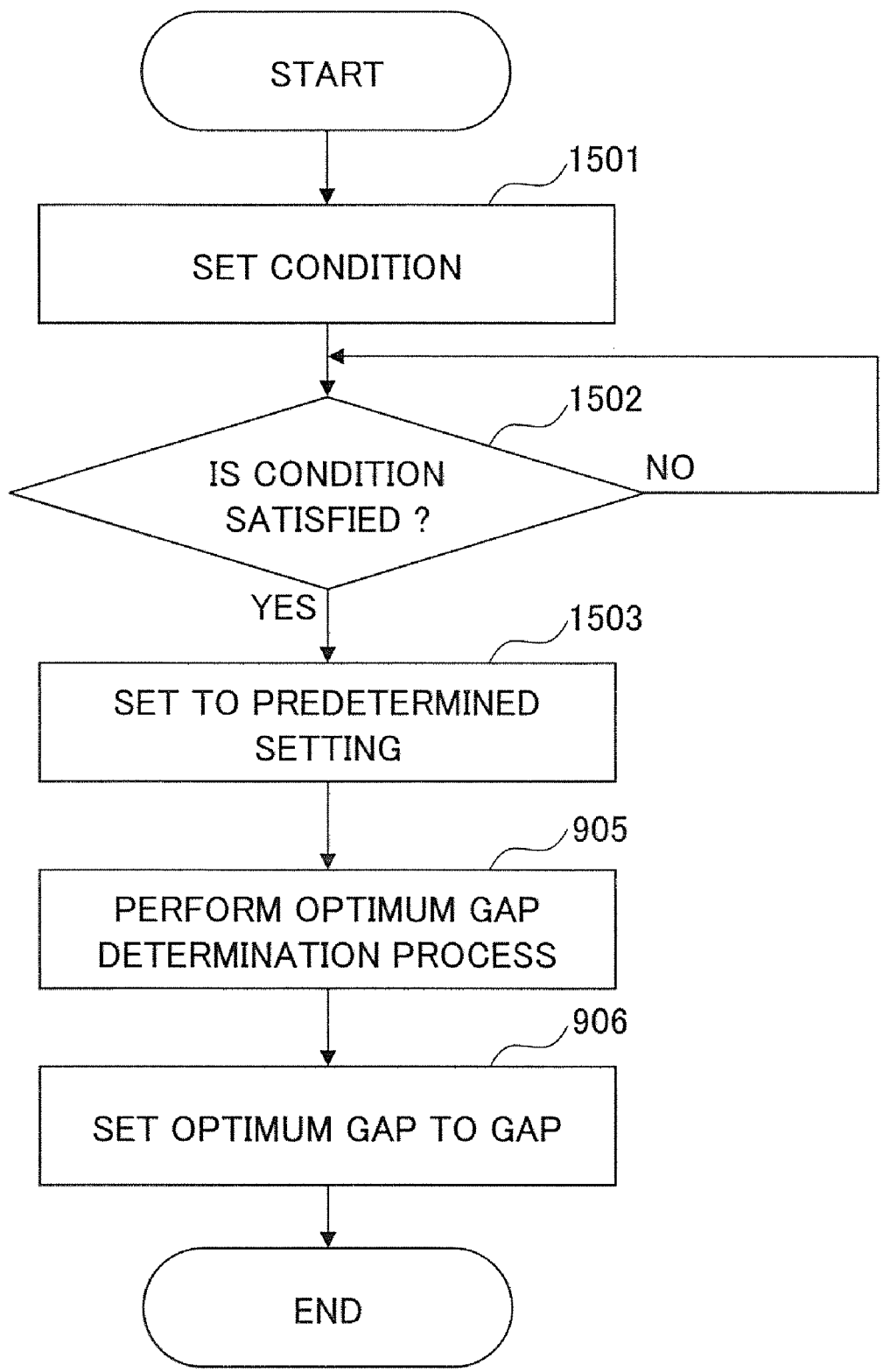
FIG. 15 is a flowchart showing a process from setting a condition to setting the optimum gap according to the third embodiment of the present invention.

FIG. 15 is a flowchart showing a process of determining the optimum gap according to the third embodiment of the present invention. In FIG. 15, the same numerals as used in FIG. 9 are commonly used to designate the same or similar processes in FIG. 9, and the descriptions thereof are omitted.

In step S1501, the condition setting means 1401 sets predetermined conditions. Herein, it is assumed that a first condition is satisfied when an optical pickup unit (OPU) seeks; a second condition is satisfied when an uncorrectable signal error occurs; and a third condition is satisfied when the drive current reaches 1.3 times the current when the gap is 250 μm and the disk 500 rotates at 15,000 rpm. However, the conditions are not limited to those conditions described above. Any other condition when the optimum gap is to be determined may be set.

After step S1501, the process goes to step S1502. In step S1502, the condition determination means 1402 determines whether at least one of the three conditions set by the condition setting means 1401 is satisfied. When "NO" is determined in step S1502, the process goes back to step S1502.

When "YES" is determined in step S1502, the process goes to step S1503. In step S1503, for example, the gap is adjusted to 250 μm and the rotational speed is set to 4,000 rpm by the adjustment means 1404 and rotational speed control means 1403, respectively. Then, the rotational speed is increased to 15,000 rpm.

After step S1503, the process goes to step S 905. In step S905, the process of determining the optimum gap is performed. As this optimum gap determining process, any of the processes that are described in the above embodiment and modified embodiments may be performed.

As described above, according to the third embodiment of the present invention, it may become possible to reduce the influences of acceptable mechanical accuracy and over time by setting the gap optimum for the environmental changes such as temperature and atmospheric pressure due to long-term use. Further, the preprocessing operation described in the modified first embodiment of the present invention shown in FIG. 9 may also be performed in the third embodiment of the present invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A recording/reproducing apparatus comprising:
    a spindle motor unit including a spindle on which a flexible recording disk is placed to be rotated so that information data are at least one of recorded onto and reproduced from the recording disk;
    a stabilizer plate disposed so as to face the recording disk;
    a torque detection unit configured to detect a drive torque applied to the spindle motor unit;
    an adjustment unit configured to adjust a gap between the recording disk and the stabilizer plate; and
    a determination unit configured to determine an optimum gap to be set to the gap based on the drive torque detected by the torque detection unit, the apparatus characterized in that
    the adjustment unit sets the optimum gap determined by the determination unit to the gap.

2. The recording/reproducing apparatus according to claim 1, further comprising:
    a calculation unit configured to calculate a change rate of the drive torque that changes as the gap is gradually reduced by the adjustment unit, wherein
    the determination unit determines the optimum gap based on the gap when the change rate calculated by the calculation unit is equal to or greater than a predetermined value.

3. The recording/reproducing apparatus according to claim 1, wherein
    the determination unit determines the optimum gap based on a gap when an absolute value of the drive torque reaches a predetermined value.

4. The recording/reproducing apparatus according to claim 1, wherein
    the adjustment unit adjusts the gap to be equal to a predetermined distance when a rotational speed of the recording disk reaches a first predetermined value after a rotation of the recording disk is started.

5. The recording/reproducing apparatus according to claim 4, wherein
    the adjustment unit reduces the gap by a predetermined unit from the predetermined distance when a rotational speed of the recording disk reaches a second predetermined value which is greater than the first predetermined value after the gap is adjusted to the predetermined distance.

6. The recording/reproducing apparatus according to claim 1, further comprising:
    a condition setting unit configured to set a predetermined condition, wherein
    the determination unit determines the optimum gap when the condition set by the condition setting unit is satisfied.

7. A recording/reproducing method in which information data are at least one of recorded onto and reproduced from a flexible recording disk placed on a spindle of a spindle motor unit by rotating the recording disk, the method comprising:
    an adjustment step of adjusting a gap which is a distance between a stabilizer plate and the recording disk;
    a torque detection step of detecting a drive torque applied to the spindle motor unit; and
    a determination step of determining an optimum gap to be set to the gap based on the drive torque detected in the torque detection step; wherein
    in the adjustment step, the optimum gap determined in the determination step is set to the gap.

8. The recording/reproducing method of claim 7, the method further comprising:
    a calculation step of calculating a change rate of the drive torque that changes as the gap is gradually reduced by the adjustment step,
    wherein in the determination step, the optimum gap to be set to the gap is determined based on the gap when the change rate calculated in the calculation step is equal to or greater than a predetermined value.

9. The recording/reproducing method of claim 7, wherein in the determination step, the optimum gap to be set to the gap is determined based on when an absolute value of the drive torque reaches a predetermined value.

10. The recording/reproducing method of claim 7, wherein in the adjustment step, the gap to be adjusted is adjusted to be equal to a predetermined distance when a rotational speed of the recording disk reaches a first predetermined value after a rotation of the recording disk is started.

11. The recording/reproducing method of claim 10, wherein in the adjustment step, the gap to be adjusted is reduced by a predetermination unit from the predetermined distance when a rotational speed of the recording disk reaches a second predetermined value which is greater that the first predetermined value after the gap is adjusted to the predetermined distance.

* * * * *